US007801886B1

(12) United States Patent
Gabriel et al.

(10) Patent No.: US 7,801,886 B1
(45) Date of Patent: Sep. 21, 2010

(54) METHOD AND APPARATUS FOR PERFORMING DATABASE OPERATIONS INVOLVING CUSTOM FIELDS

(75) Inventors: Michael R. Gabriel, Foster City, CA (US); Roy Goldman, Cupertino, CA (US)

(73) Assignee: Intuit Inc., Mountain View, CA (US)

( * ) Notice: Subject to any disclaimer, the term of this patent is extended or adjusted under 35 U.S.C. 154(b) by 233 days.

(21) Appl. No.: 11/545,400

(22) Filed: Oct. 10, 2006

(51) Int. Cl.
G06F 7/00 (2006.01)
G06F 17/30 (2006.01)
G06F 15/173 (2006.01)
G06F 15/16 (2006.01)

(52) U.S. Cl. .................. 707/715; 709/223; 709/229
(58) Field of Classification Search .................. 707/100
See application file for complete search history.

(56) References Cited

U.S. PATENT DOCUMENTS

| | | | | |
|---|---|---|---|---|
| 6,662,199 B1 * | 12/2003 | Flight et al. | ............... | 707/104.1 |
| 6,999,965 B1 * | 2/2006 | Cesarotti et al. | ................... | 1/1 |
| 7,467,198 B2 * | 12/2008 | Goodman et al. | ........... | 709/223 |
| 2002/0156792 A1 * | 10/2002 | Gombocz et al. | ........... | 707/100 |
| 2003/0120665 A1 * | 6/2003 | Fox et al. | ..................... | 707/100 |
| 2003/0145013 A1 * | 7/2003 | Kovarik et al. | .............. | 707/100 |
| 2005/0015381 A1 * | 1/2005 | Clifford et al. | .............. | 707/100 |
| 2005/0234868 A1 * | 10/2005 | Terek et al. | .................... | 707/1 |
| 2005/0240606 A1 * | 10/2005 | Edelstein et al. | ............ | 707/100 |
| 2005/0289160 A1 * | 12/2005 | Ashwin et al. | .............. | 707/100 |
| 2005/0289166 A1 * | 12/2005 | Stanley et al. | ............... | 707/100 |
| 2006/0095440 A1 * | 5/2006 | Dettinger et al. | ............ | 707/100 |
| 2006/0218159 A1 * | 9/2006 | Murphy et al. | .............. | 707/100 |

OTHER PUBLICATIONS

Data Engineering; 1976; The Computer Society; pp. 25-35.*

* cited by examiner

*Primary Examiner*—Neveen Abel Jalil
*Assistant Examiner*—Jermaine Mincey
(74) *Attorney, Agent, or Firm*—Park, Vaughan & Fleming LLP

(57) ABSTRACT

A system that performs a database operation which involves accessing user-defined fields which are stored in a custom field table, wherein the user-defined fields are used to augment an existing table. During operation, the system performs the database operation which involves accessing the user defined fields. While accessing the user-defined fields, the system performs a mapping between the user-defined fields and custom fields in the custom field table, wherein each row in the custom field table includes a position field and multiple custom fields.

31 Claims, 2 Drawing Sheets

METHOD AND APPARATUS FOR PERFORMING DATABASE OPERATIONS INVOLVING CUSTOM FIELDS

BACKGROUND

The present invention relates to techniques for performing database operations involving custom fields.

The structure of a table in a relational database system is typically defined when the table is created. For example, creating the table can involve defining the data types of fields, the names of fields, and various field constraints. However, in many situations, fields in an existing table may need to be augmented to accommodate additional data. For example, a user may desire to add user-defined fields, such as a birthday field or a spouse field, to an existing customer table that already includes a name field and a balance field.

One solution to this problem is to add user-defined fields directly to an existing table. This technique is referred to as the "alter table" technique. For example, consider a customer table defined as follows:

| customer | |
|---|---|
| customer_id | int |
| name | varchar(50) |
| balance | double |

Adding a user-defined field to the customer table to store birthdays involves executing the following Structured Query Language (SQL) query:

ALTER TABLE customer ADD birthday DATETIME;

This query modifies the data structure of the customer table as follows:

| customer | |
|---|---|
| customer_id | int |
| name | varchar(50) |
| balance | double |
| birthday | datetime |

Since the birthday field is part of the customer table, an SQL query which retrieves the names and the birthdays for the customers stored in the customer table can have the following form:

SELECT name, birthday FROM customer;

Several issues should be considered when determining whether to use the alter table technique:
(1) when a table is in the process of being altered, it is locked and no other user can access the table;
(2) query performance is good and can be improved by adding an index to the user-defined field;
(3) custom fields can be added as they are needed and can be deleted when they are no longer needed;
(4) schema changes must be propagated to every database in the database environment;
(5) user-defined field names must be prevented from conflicting with any derived table names (present or future); and
(6) if multiple users share a common schema in a hosted environment, this technique produces extremely wide tables with sparse data.

A variation of the alter table technique assumes that all users in the database environment share the same database schema. In this case, users share custom field definitions and the database only creates a new custom field if one is not already available. For example, the customer table might already contain a user-defined integer field:

| customer | |
|---|---|
| customer_id | int |
| name | varchar(50) |
| balance | double |
| custom_int_1 | int |

Hence, a first user can use the field custom_int_1 to record the age of customers, while a second user can use the field custom_int_1 to record how many children a customer has. Since the custom field name no longer describes the purpose of the field, metadata can be used to provide this information.

Next, if the first user additionally desires to store the birthdays for customers in the table, an ALTER TABLE command can be used to add a custom date field to the customer table, which results in the following structure for the customer table:

| customer | |
|---|---|
| customer_id | int |
| name | varchar(50) |
| balance | double |
| custom_int_1 | int |
| custom_date_1 | datetime |

The change to the structure of the customer table is then propagated to the database for the second user (and to other users sharing the same schema). Next, if the second user decides to create a new datetime field for the customer table, the system can reuse custom_date_1. If the change to the structure of the customer table has not been propagated to the database environment for the second user, it is propagated at this point.

The advantage of using the alter table technique is that no joins are required to retrieve the data, so the data accesses are fast. Unfortunately, as more user-defined fields are added to the existing table it becomes more difficult to manage upgrades to the existing table.

SUMMARY

One embodiment of the present invention provides a system that performs a database operation which involves accessing user-defined fields which are stored in a custom field table, wherein the user-defined fields are used to augment an existing table. During operation, the system performs the database operation which involves accessing the user-defined fields. While accessing the user-defined fields, the system performs a mapping between the user-defined fields and custom fields in the custom field table, wherein each row in the custom field table includes a position field and multiple custom fields.

In a variation on this embodiment, while performing the mapping the system determines the number of custom fields in each row in the custom field table. Next, the system maps a user-defined field to a custom field in the custom field table by: (1) starting with an index for the user-defined field; (2) calculating a position value for the user-defined field based on the index for the user-defined field and the number of custom fields in each row in the custom field table, wherein the position value facilitates identifying a specific row containing the user-defined field in the custom field table; and (3) calculating a custom field index for the user-defined field based on the index for the user-defined field and the number of custom fields in each row, wherein the custom field index identifies a specific custom field containing the user-defined field in the identified row.

In a further variation, while calculating the position value, the system divides the index for the user-defined field by the number of custom fields in each row of the custom field table to produce an integer quotient.

In a further variation, while calculating the custom field index, the system calculates the modulus of the index for the user-defined field with respect to the number of custom fields in each row.

In a further variation, if the database operation is an insert operation for one or more user-defined fields associated with a row in the existing table, the system inserts values for the user-defined fields into the custom field table by performing the following operations: for each user-defined field value to be inserted, the system uses the mapping to determine the position value and the custom field index for the user-defined field, and then inserts the user-defined field value into a custom field associated with the custom field index in a row associated with the position value and an index for the corresponding row in the existing table.

In a further variation, if the database operation is an update operation for one or more user-defined fields associated with a row in the existing table, the system updates values for the user-defined fields in the custom field table by performing the following operations: for each user-defined field to be updated, the system uses the mapping to determine the position value and the custom field index for the user-defined field, and then updates the custom field that corresponds to the custom field index in a row that is associated with the position value and an index for the corresponding row in the existing table.

In a further variation, if the database operation is a select operation for one or more user-defined fields associated with a row in the existing table, the system selects values for the user-defined fields from the custom field table by performing the following operations: for each user-defined field to be selected, the system uses the mapping to determine the position value and the custom field index for the user-defined field, and selects the value stored in a custom field that corresponds to the custom field index in a row that is associated with the position value and an index for the corresponding row in the existing table.

In a variation on this embodiment, the database operation is a database operation defined by a Structured Query Language (SQL) query.

Table 1 presents an explicitly-typed custom field table in accordance with an embodiment of the present invention.

Table 2 presents blob-typed custom field table in accordance with an embodiment of the present invention.

Table 3 presents an exemplary entry for a customer table in accordance with an embodiment of the present invention.

Table 4 presents exemplary entries for a customer custom field table in accordance with an embodiment of the present invention.

Table 5 presents an exemplary result set for a customer table in accordance with an embodiment of the present invention.

Table 6 presents exemplary entries for a customer custom field table in accordance with an embodiment of the present invention.

Table 7 presents an exemplary custom field table for a customer table in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Computer System

Figure 1:
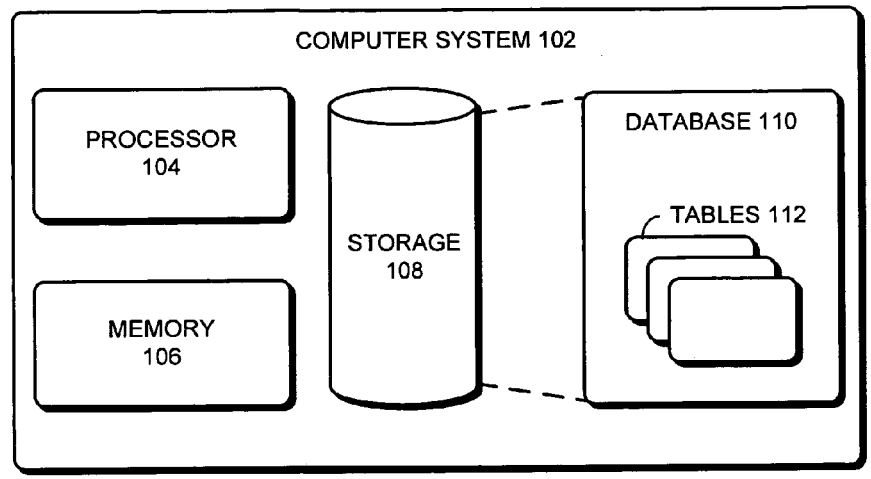
FIG. 1 presents a block diagram of a computer system in accordance with an embodiment of the present invention.

FIG. 1 presents a block diagram of a computer system 102 in accordance with an embodiment of the present invention. Computer system 102 includes processor 104, memory 106, and storage 108.

Processor 104 can generally include any type of processor, including, but not limited to, a microprocessor, a mainframe computer, a digital signal processor, a personal organizer, a device controller and a computational engine within an appliance. Memory 106 can include any type of memory, including but not limited to, dynamic random access memory (DRAM), static random access memory (SRAM), flash memory, and read-only memory (ROM). Storage device 108 can include any type of non-volatile storage device that can be coupled to a computer system. This includes, but is not limited to, magnetic, optical, and magneto-optical storage devices, as well as storage devices based on flash memory and/or battery-backed up memory.

In one embodiment of the present invention, storage device 108 contains database 110, which includes tables 112. In one embodiment of the present invention, database 110 can include a relational database, a flat database, a hierarchical database, or a network database.

In one embodiment of the present invention, database 110 is located on a storage device which is separate from computer system 102. For example, the storage device can reside within another computer system or within a storage array network (SAN).

Overview

In one embodiment of the present invention, user-defined fields can be added to an existing table within a database without modifying the structure of the existing table.

In one embodiment of the present invention, strongly-typed custom fields are supported. For example, consider a customer table which includes a name field and a balance field. A user can augment the customer table by adding a user-defined field called birthday which has a datetime data type. In one embodiment of the present invention, the user-defined fields are stored in a custom field table. Database functions and queries that operate on a datetime data type can be applied to the birthday field. For example, a query that returns all customers with a birthday in the current month can be generated using date-comparison functions provided by the database.

In one embodiment of the present invention, the number of user-defined fields that can be added to an existing table is unlimited.

Several factors are considered when choosing a technique to support user-defined fields. These include, but are not limited to, determining the table data structure used to store the user-defined fields, determining the data type for fields used to store user-defined fields, and determining a technique to integrate the support for user-defined fields into the existing database schema.

Table Design

One embodiment of the present invention uses a technique which stores user-defined fields to a custom field table which contains a predetermined number of custom fields. This is referred to as the "wide table" technique.

Another technique stores user-defined fields in a custom field table which has a single custom field. This technique uses a "position value" to index a specific row in the custom field table which corresponds to a specific user-defined field. This technique is referred to as the "vertical table" technique.

Wide Tables

Wide custom field tables are designed to store a predetermined number of user-defined fields. Consider the following customer table and customer_custom_field table:

| customer | |
|---|---|
| customer_id | int |
| name | varchar(50) |
| balance | double |
| customer_custom_field | |
| customer_id | int |
| custom_field_0 | blob |
| custom_field_1 | blob |
| custom_field_2 | blob |
| custom_field_3 | blob |

Each row in the customer_custom_field table has four predefined custom fields (i.e., custom_field_0, custom_field_1, custom_field_2, and custom_field_3). Note that instead of using a blob data type for the custom fields, the present invention can use other database data types. Also note that a user can use any of these custom fields to store data, and that user-defined metadata can be used to specify the name and data type of the custom fields.

Under this technique, query performance is good, and the maintenance and the design of the database schema are simple. However, the wide custom field table can contain sparse data if a user only uses a small number of the available custom fields. Furthermore, since the wide table includes a predetermined number of custom fields, user customization is limited.

Vertical Tables

A "vertical table" is a variation of sparse array implementations. Consider the following tables:

| customer | |
|---|---|
| customer_id | int |
| name | varchar(50) |
| balance | double |
| customer_custom_field | |
| customer_id | int |
| position | int |
| value | int |

Note that the data type of the value field can be defined using any data type supported by the database. Moreover, a vertical table is very flexible. For example, adding a new user-defined field involves adding a new row to the vertical table. Hence, the number of user-defined fields that can be supported by a vertical table is limited only by the constraints of the database. For example, if a user wants to add three user-defined fields to the customer table to store information about the number of children, the number of pets, and the number of cars each customer has (children, pets, and cars, respectively), up to three rows in the customer_custom_field table are used for each customer. Note that the number of rows in the customer_custom_field table that are used to store the data for the user-defined fields can vary depending on the customer. For example, a customer may only have children, but no cars or pets. Hence, the customer_custom_field may only contain one row for this customer (i.e., a row to indicate the number of children that the customer has).

The position field and the customer_id field are used to identify a given user-defined field for a given customer. For example, the value of the position field for children can be 0, the value of the position field for pets can be 1, and the value of the position field for cars can be 2. In this case, an entry for a customer and the entries in the associated customer_custom_field can be as follows:

TABLE 3

| customer table entry | | |
|---|---|---|
| customer_id | name | balance |
| 103 | John | 100.30 |

TABLE 4

| customer_custom_field table entries | | |
|---|---|---|
| customer_id | position | value |
| 103 | 0 | 2 |
| 103 | 1 | 1 |
| 103 | 2 | 5 |

These entries indicate that John has 2 children, 1 pet, and 5 cars.

An SQL query used to retrieve this information can be formed as follows:

```
SELECT c.name, cf0.value, cf1.value, cf2.value
FROM customer c
LEFT OUTER JOIN customer_custom_field cf0 ON
    (c.customer_id=cf0.customer_id
    AND cf0.position=0)
LEFT OUTER JOIN customer_custom_field cf1 ON
    (c.customer_id=cf1.customer_id
    AND cf1.position=1)
LEFT OUTER JOIN customer_custom_field cf2 ON
    (c.customer_id=cf2.customer_id
    AND cf2.position=2)
WHERE c.customer_id=103
```

This query generates a result set with a single row:

TABLE 5

| Exemplary result set | | | |
|---|---|---|---|
| c.name | cf0.value | cf1.value | cf2.value |
| John | 2 | 1 | 3 |

An advantage of using this technique is that the schema is simple to maintain even if all users share the same schema. Hence, if one user has three custom fields while a second user has four custom fields, there is no sparseness in the data because only those user-defined fields which have values are stored in the custom field table. The number of possible custom fields is limited only by the hardware constraints of the system. A disadvantage of this technique is that query performance is decreased. However, indexing can be used to partially compensate for this performance degradation.

Hybrid Table Designs

The above-described table design techniques are not mutually exclusive. Hence, one embodiment of the present invention uses a hybrid table which combines the wide table technique with the vertical table technique, to store user-defined fields. For example, consider the following tables:

| customer | |
|---|---|
| customer_id | int |
| name | varchar (50) |
| balance | double |

| customer_custom_field | |
|---|---|
| customer_id | int |
| position | int |
| custom_value_0 | int |
| custom_value_1 | int |

In one embodiment of the present invention, the customer_custom_field table includes a position field and two custom fields (custom_value_0 and custom_value 1). If one or two user-defined fields are defined, one row of the customer_custom_field is used to store data for the user-defined fields for a given customer. (Note that in this case, the customer_custom_field table operates in a similar fashion to a wide table.) If three or more user-defined fields are defined, extra rows of the customer_custom_field are used to store data for the user-defined fields. In one embodiment of the present invention, the number of rows in the customer_custom_field table that are used to store the user-defined fields is determined by dividing the index for the user defined field by the number of custom fields in each row of the custom field table to produce an integer quotient. For example, consider the values in the customer table listed in Table 3 and the values in the customer_custom_field table listed in Table 4. The hybrid customer_custom_field table stores this data as follows:

TABLE 6

| Customer custom field table entries | | | |
|---|---|---|---|
| customer_id | position | custom_value_0 | custom_value_1 |
| 103 | 0 | 2 | 1 |
| 103 | 1 | 5 | |

An SQL query to retrieve the values can be formed as follows:

```
SELECT c.name, cf0.custom_value_0,
    cf0.custom_value_1, cf1.custom_value_0,
    cf1.custom_value 1
FROM customer c
LEFT OUTER JOIN customer_custom_field cf0 ON
    (c.customer_id=cf0.customer_id
    AND cf0.position=0)
LEFT OUTER JOIN customer_custom_field cf1 ON
    (c.customer_id=cf1.customer_id
    AND cf1.position=1);
```

Note that the number of custom fields used in the hybrid table can vary depending on the application. Hence, in other embodiments of the present invention, customer_custom_field table can include a specified number of custom fields based on the application.

Using this hybrid approach has several advantages:
(1) a wide table is no longer limited by a predefined number of custom fields;
(2) the sparseness of the data can be tuned by using more or fewer custom fields;
(3) the flexibility of the vertical approach is preserved; and
(4) the performance degradation of the idealized vertical approach is reduced.

A disadvantage of this approach is the extra complexity involved in generating a query for a particular custom field.

User-Defined Field Data Types

Some applications require strongly-typed fields. Several techniques can be used to support strongly-typed fields. In one embodiment of the present invention, user-defined fields are stored in explicitly-typed fields. In another embodiment of the present invention, user-defined fields are stored in blob-typed fields and a type cast function is used to cast the blob-typed fields into desired data types.

Explicitly-Typed User-Defined Fields

One embodiment of the present invention provides support for a strongly-typed user-defined field by storing data in an explicitly-typed field. For example, consider a custom field table which includes an integer custom field:

| integer_custom_field | |
|---|---|
| custom_field_id | int |
| int_custom_value | int |

Integer operations can be used when performing a query on the integer_custom_field table. For example, an SQL query used to generate a result set which includes values in the int_custom_value field between 5 and 30 can be formed as follows:

SELECT custom_field_id, int_custom_value
FROM integer_custom_field_table
WHERE int_custom_value>5
  AND int_custom_value<30;

Similarly, integer aggregation functions can be used when performing a query on the integer_custom_field table. For example, an SQL query which can be used to calculate the sum of all values in the int_custom_value field is:

SELECT SUM(int_custom_value)
FROM integer_custom_field_table;

Note that creating an index on the custom field can improve the performance of queries involving the custom field.

A disadvantage of using explicitly-typed custom fields is that it can lead to sparsely populated tables. Custom field tables that support explicitly-typed fields are designed to store a single custom value in each row. For example, consider a custom field table which supports multiple data types:

| generic_custom_field | |
|---|---|
| custom_field_id | int |
| int_value | int |
| date_value | datetime |
| string_value | varchar (100) |
| double_value | double |

Hence, each row in this table contains three NULLS:

TABLE 1

| Explicitly-typed custom field table | | | | |
|---|---|---|---|---|
| custom_field_id | int_value | date_value | string_value | double_value |
| 1 | 2 | NULL | NULL | NULL |
| 2 | NULL | 12/28/05 | NULL | NULL |
| 3 | NULL | NULL | 'hey now' | NULL |
| 4 | NULL | NULL | NULL | 12.23 |

Note that the data in this table is sparse and becomes more sparse as more data types are added to this table.

Blob-Typed User-Defined Fields

One embodiment of the present invention provides support for a strongly-typed user-defined field by storing data in a blob-typed fields. Note that any data type which can support a variable length data can be used. For example, instead of using a blob-typed field, the present invention can use a varchar-typed field. Strongly-typed operations are performed using type casts. For example, consider the following table:

| blob_custom_field | |
|---|---|
| custom_field_id | int |
| blob_value | blob |

If the blob_value field in the blob_custom_field table is used to store integers, then an SQL query which can be used to generate a result set which includes values in the blob_value fields between 5 and 30 is:

SELECT custom_field_id,
  CAST (blob_value as int)
FROM blob_custom_field_table
WHERE CAST (blob_value as int)>5
  AND CAST (blob_value as int)<30;

Similarly, a SQL query which can be used to calculate the sum of all values in the blob_value field is:

SELECT SUM(CAST(blob_value as int))
FROM blob_custom field table;

An advantage of using a blob-typed field to store the data is that the occurrence of sparse data is reduced. A custom field table can mix data types freely, relying on metadata in the data layer to determine the intended data type for an entry in the custom field table. For example, Table 2 illustrates a blob-typed custom field table wherein each row is associated with a different data type:

TABLE 2

| Blob-typed custom field table | |
|---|---|
| custom_field_id | blob_value |
| 1 | 2 |
| 2 | Feb. 24, 2004 |
| 3 | 'my text data' |

In Table 2, the first row stores a value for an integer-typed user-defined field, the second row stores a date-typed user-defined field, and the third row stores a varchar-typed user-defined field.

Unfortunately, when using custom field tables that support blob-typed fields, the database cannot enforce type safety. Hence, the upper application layers must ensure that incompatible data types are not mixed. Furthermore, indexing becomes more difficult.

Table Integration into Schema

Several options exist to integrate a given table design into the database schema.

Custom Fields on an Existing Table (Native Custom Fields)

In one embodiment of the present invention, custom fields can be added directly to an existing table using the alter table technique. In this case, the exemplary customer table contains custom fields:

| customer | |
|---|---|
| customer_id | int |
| name | varchar (50) |
| balance | double |
| date_custom_field | datetime |
| int_custom_field | int |

Single Custom Field Table

One embodiment of the present invention uses a single custom field table to store user-defined fields for all existing tables in the database schema. For example, a custom_field table may be defined as follows:

| custom_field | |
|---|---|
| entity_id | int |
| custom_field_id | int |
| int_custom_field_1 | int |
| int_custom_field_2 | int |
| date_custom_field_1 | datetime |
| date_custom_field_1 | datetime |

To retrieve values stored in custom fields for an existing table a join operation is used in the SQL query. For example, an SQL query that can be used to retrieve a customer name from a customer table and to retrieve a user-defined integer field stored in the custom_field table is:

SELECT c.name, cf.int_custom_field_1
    FROM customer c
    LEFT OUTER JOIN custom_field cf ON
        c.customer_id=cf.entity_id;

Note that entity_id is a foreign key that refers to a primary key in an existing table. In this example, entity_id refers to the customer_id in the customer table. The join condition listed above requires that the entity_id to be unique for all tables in the database system. If the primary keys for each table is unique within the table, but is not unique across the database system, a compound key, such as (entity_id, entity_name) can be used to uniquely identify the existing table being augmented.

An advantage of this technique is that it is simple to manage. Every table can be joined to the same custom field table. New entities automatically get custom field support. A disadvantage of this technique is that the custom field table can become large if every table in the system has custom fields. Furthermore, foreign key constraints cannot be added to the relationships.

One Custom Field Table per Entity

Instead of using a single table to support user-defined fields for all existing tables, one embodiment of the present invention uses a custom field table for each existing table to be augmented. For example, consider the following customer table and customer_custom_field table:

| customer | |
|---|---|
| customer_id | int |
| name | varchar (50) |
| balance | double |

| customer_custom_field | |
|---|---|
| customer_id | int |
| custom_field_1 | blob |
| custom_field_2 | blob |
| custom_field_3 | blob |
| custom_field_4 | blob |

If custom_field_1 is an integer field, the query to retrieve values in custom_field_1 is:

SELECT c.name, CAST (cf.custom_field_1 AS int)
    FROM customer c
    LEFT OUTER JOIN custom_field table cf ON
        c.customer_id=cf.entity_id;

Unlike the single custom field table technique, the size of the custom field table is only as large as what is necessary for each table to be augmented. Moreover, foreign key constraints can be applied to the relationship. Furthermore, entity IDs do not need to be unique across the entire database environment. A disadvantage of this technique is that the number of tables in the schema can double, making the management of the schema more difficult.

Custom Field Types in Separate Tables

If strongly-typed fields are used instead of blob data type, the table data structures shown above may have sparse data. For example, a strongly-typed vertical table may be defined as follows:

| custom_field | |
|---|---|
| entity_id | int |
| position | int |
| int_value | int |
| date_value | datetime |
| string_value | varchar (100) |

In this implementation, only one value field can be used for each position. This creates a sparse data set, as illustrated in Table 7:

TABLE 7

Custom field table

| entity_id | position | int_value | date_value | string_value |
|---|---|---|---|---|
| 1 | 0 | 4 | <NULL> | <NULL> |
| 1 | 1 | <NULL> | Sep. 23, 2005 | <NULL> |
| 1 | 2 | <NULL> | <NULL> | Bleah! |

Hence, to reduce the sparse data, one embodiment of the present invention uses a separate custom field table for each custom field data type:

| custom_field_int | |
|---|---|
| entity_id | int |
| position | int |
| value | int |

| custom_field_date | |
|---|---|
| entity_id | int |
| position | int |
| value | datetime |

| custom_field_string | |
|---|---|
| entity_id | int |
| position | int |
| value | varchar (100) |

However, this technique makes queries more complex, requiring a join for every custom field type table which is used to augment an existing table. For example, if the data types for the custom fields are int, date, string, and int, the SQL query that can be used to retrieve these fields is:

SELECT c.name, cf0.value, cf1.value, cf2.value, cf3.value
    FROM Customer c
    LEFT OUTER JOIN custom_field_int cf0 ON
        (c.customer_id=cf0.entity_id AND cf0.position=0)
    LEFT OUTER JOIN custom_field_date cf1 ON
        (c.customer_id=cf1.entity_id AND cf1.position=1)
    LEFT OUTER JOIN custom_field_string cf2 ON
        (c.customer_id=cf2.entity_id AND cf1.position=2)
    LEFT OUTER JOIN custom_field_int cf3 ON
        (c.customer_id=cf3.entity_id AND cf1.position=3);

One embodiment of the present invention uses explicitly-typed custom fields with a wide-vertical hybrid data structure for the custom field wherein one custom field table is used for each table that is to be augmented.

Database Operations on Custom Field Tables

Figure 2:
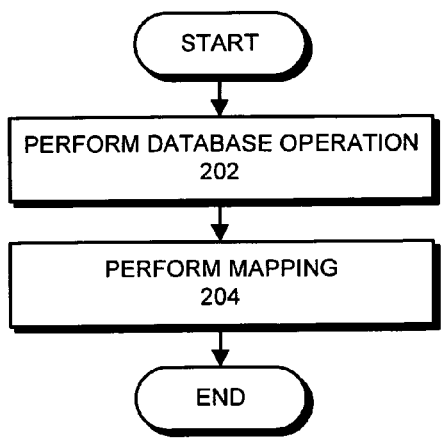
FIG. 2 presents a flow chart illustrating the process of performing a database operation in accordance with an embodiment of the present invention.

FIG. 2 presents a flow chart illustrating the process of performing a database operation in accordance with an embodiment of the present invention. During this process the system accesses user-defined fields which are stored in a custom field table, wherein the user-defined fields are used to augment an existing table. The process begins when the system performs the database operation which involves accessing the user-defined fields (step 202). In doing so, the system performs a mapping between the user-defined fields and custom fields in the custom field table (step 204). In one embodiment of the present invention each row in the custom field table includes a position field and multiple custom fields.

Figure 3:
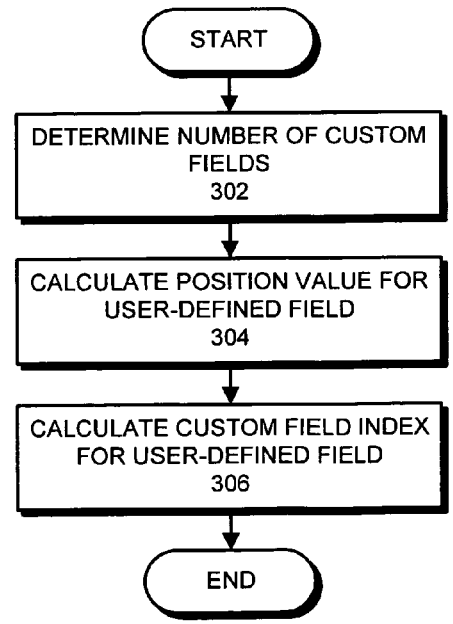
FIG. 3 presents a flow chart illustrating the process of mapping user-defined fields to custom fields in accordance with an embodiment of the present invention.

FIG. 3 presents a flow chart illustrating the process of mapping user-defined fields to custom fields in accordance with an embodiment of the present invention. The process begins when the system determines the number of custom fields in each row in the custom field table (step 302). Next, the system calculates a position value for the user-defined field based on the index for the user-defined field and the number of custom fields in each row in the custom field table, wherein the position value facilitates identifying a specific row containing the user-defined field in the custom field table (step 304). In one embodiment of the present invention, while calculating the position value, the system divides the index for the user defined field by the number of custom fields in each row of the custom field table to produce an integer quotient.

The system then calculates a custom field index for the user-defined field based on the index for the user-defined field and the number of custom fields in each row, wherein the custom field index identifies a specific custom field containing the user-defined field in the identified row (step 406). In one embodiment of the present invention, while calculating the custom field index, the system calculates the modulus of the index for the user-defined field with respect to the number of custom fields in each row.

Figure 4:
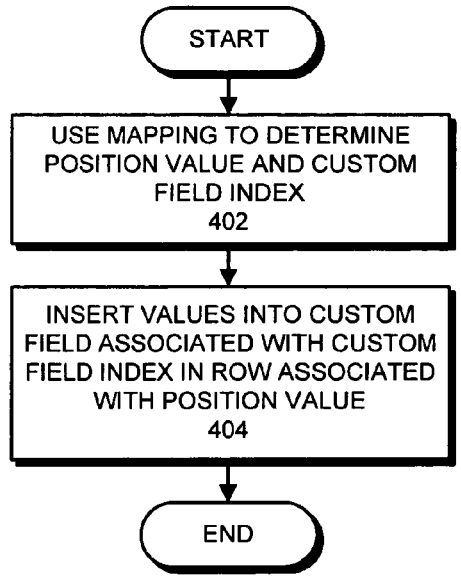
FIG. 4 presents a flow chart illustrating the process of inserting values into custom fields in accordance with an embodiment of the present invention.

FIG. 4 presents a flow chart illustrating the process of inserting values for user-defined fields into a custom field table in accordance with an embodiment of the present invention. At the beginning of the process, for each user-defined field value to be inserted, the system uses the mapping to determine the position value and the custom field index for the user-defined field (step 402). The system then inserts the values into a custom field associated with the custom field index in a row associated with the position value and an index for a corresponding row in the existing table (step 404).

Figure 5:
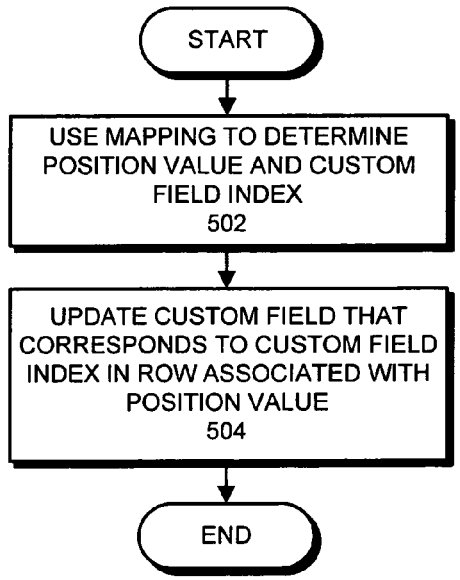
FIG. 5 presents a flow chart illustrating the process of updating values in custom fields in accordance with an embodiment of the present invention.

FIG. 5 presents a flow chart illustrating the process of updating values for user-defined fields in a custom field table in accordance with an embodiment of the present invention. At the beginning of the process, for each user-defined field to be updated, the system uses the mapping to determine the position value and the custom field index for the user-defined field (step 502). The system then updates the custom field that corresponds to the custom field index in a row that is associated with the position value and an index for a corresponding row in the existing table (step 504).

Figure 6:
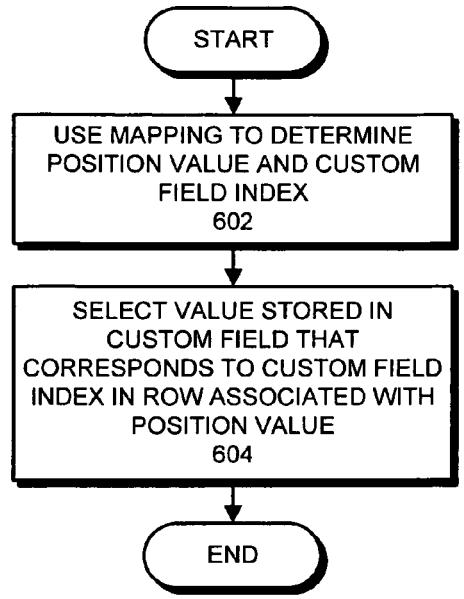
FIG. 6 presents a flow chart illustrating the process of selecting values from custom fields in accordance with an embodiment of the present invention.

FIG. 6 presents a flow chart illustrating the process of selecting values for user-defined fields from a custom field table in accordance with an embodiment of the present invention. At the beginning of the process, for each user-defined field to be selected, the system uses the mapping to determine the position value and the custom field index for the user-defined field (step 602). The system then selects the value stored in a custom field that corresponds to the custom field index in a row that is associated with the position value and an index for a corresponding row in the existing table (step 604).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for accessing user-defined fields of a table, the method comprising:
    receiving a database operation that involves accessing a record in the user-defined fields of the table,
        wherein the record is mapped to a record stored in a custom field of a custom-field table associated with the table,
        wherein the record in the custom field is of the same data type and has the same index value as the record in the user-defined field, and
        wherein a value for the record in the user-defined field is stored in the custom field at a position based on an integer quotient, which is determined by dividing the index value by the number of customer fields in each row of the custom-field table;
    mapping, by computer, the user-defined field to the custom field of the custom-field table by:
        identifying the index value associated with the user-defined field;
        identifying the position associated with the user-defined field; and
        identifying the record corresponding to the user-defined field among records in the custom field of the custom-field table based on the index value and the position; and
    allowing the database operation to access the identified record in the custom field of the custom-field table.

2. The method of claim 1, wherein mapping the user-defined field to the custom field in the custom-field table comprises:
    calculating the position for the user-defined field based on the integer quotient, wherein the position facilitates identifying a specific row containing the user-defined field in the custom-field table; and
    calculating the custom field index for the user-defined field based on the index for the user-defined field and the number of custom fields in each row, wherein the custom field index identifies a specific custom field containing the user-defined field in the identified row.

3. The method of claim 2, wherein calculating the position involves dividing the index for the user-defined field by the number of custom fields in each row of the custom-field table to produce an integer quotient.

4. The method of claim 2, wherein calculating the custom field index involves calculating the modulus of the index for the user-defined field with respect to the number of custom fields in each row.

5. The method of claim 2, wherein if the database operation is an insert operation for user-defined field associated with a row in the existing table, the method further comprises inserting a value for the user-defined field into the custom-field table by performing the following operations:
    using the mapping to determine the position and the custom field index for the user-defined field; and
    inserting the values into a custom field associated with the custom field index in a row associated with the position and an index for a corresponding row in the existing table.

6. The method of claim 2, wherein if the database operation is an update operation for the user-defined field associated with a row in the existing table, the method further comprises updating a value for the user-defined field in the custom-field table by performing the following operations:

using the mapping to determine the position and the custom field index for the user-defined field; and updating the custom field that corresponds to the custom field index in a row that is associated with the position and an index for a corresponding row in the existing table.

7. The method of claim 2, wherein if the database operation is a select operation for the user-defined field associated with a row in the existing table, the method further comprises selecting a value for the user-defined field from the custom-field table by performing the following operations:

using the mapping to determine the position and the custom field index for the user-defined field; and selecting the value stored in a custom field that corresponds to the custom field index in a row that is associated with the position and an index for a corresponding row in the existing table.

8. The method of claim 1, wherein the database operation is a database operation defined by a Structured Query Language (SQL) query.

9. A non-transitory computer-readable storage medium storing instructions that when executed by a computer cause the computer to perform a method for accessing user-defined fields of a table, wherein the method comprises:

receiving the database operation that involves accessing a record in the user-defined fields of the table, wherein the record is mapped to a record stored in a custom field of a custom-field table associated with the table, wherein records the record in the custom field of the same data type and has the same index value as the record in the user-defined field, and wherein a corresponding value for the record in the user-defined field is stored in the custom field at a position based on an integer quotient, which is determined by dividing the index value by the number of customer fields in each row of the custom-field table;

mapping the user-defined field to the custom field of the custom-field table by:

identifying the index value associated with the user-defined field;

identifying the position associated with the user-defined field; and identifying the record corresponding to the user-defined field among records in the custom field of the custom-field table based on the index value and the position; and allowing the database operation to access the identified record in the custom field of the custom-field table.

10. The computer-readable storage medium of claim 9, wherein mapping the user-defined field to the custom field in the custom-field table comprises:

calculating the position value for the user-defined field based on the integer quotient, wherein the position facilitates identifying a specific row containing the user-defined field in the custom-field table; and calculating the custom field index for the user-defined field based on the index for the user-defined field and the number of custom fields in each row, wherein the custom field index identifies a specific custom field containing the user-defined field in the identified row.

11. The computer-readable storage medium of claim 10, wherein calculating the position involves dividing the index for the user-defined field by the number of custom fields in each row of the custom-field table to produce an integer quotient.

12. The computer-readable storage medium of claim 10, wherein calculating the custom field index involves calculating the modulus of the index for the user-defined field with respect to the number of custom fields in each row.

13. The computer-readable storage medium of claim 10, wherein if the database operation is an insert operation for the user defined field associated with a row in the existing table, the method further comprises inserting a value for the user-defined field into the custom-field table by performing the following operations:

using the mapping to determine the position and the custom field index for the user-defined field; and inserting the values into a custom field associated with the custom field index in a row associated with the position value and an index for a corresponding row in the existing table.

14. The computer-readable storage medium of claim 10, wherein if the database operation is an update operation for the user-defined field associated with a row in the existing table, the method further comprises updating a value for the user-defined field in the custom-field table by performing the following operations:

using the mapping to determine the position and the custom field index for the user-defined field; and updating the custom field that corresponds to the custom field index in a row that is associated with the position and an index for a corresponding row in the existing table.

15. The computer-readable storage medium of claim 10, wherein if the database operation is a select operation for the user-defined field associated with a row in the existing table, the method further comprises selecting a value for the user-defined field from the custom-field table by performing the following operations:

using the mapping to determine the position and the custom field index for the user-defined field; and selecting the value stored in a custom field that corresponds to the custom field index in a row that is associated with the position and an index for a corresponding row in the existing table.

16. The computer-readable storage medium of claim 9, wherein the database operation is a database operation defined by a Structured Query Language (SQL) query.

17. An apparatus for accessing user-defined fields of a table, the apparatus comprising:

a processor;

a memory;

a storage device; and a database which is configured to receive a database operation that involves accessing a record in the user-defined fields of the table, wherein the record is mapped to a record stored in a custom field of a custom-field table associated with the table, wherein the record in the custom field is of the same data type and has the same index value as the record in the user-defined field, and wherein a value for the record in the user-defined field is stored in the custom field at a position based on an integer quotient, which is determined by dividing the index value by the number of customer fields in each row of the custom-field table;

a mapping mechanism configured to map the user-defined field to the custom field of the custom-field table by:

identifying the index value associated with the user-defined field;

identifying the position associated with the user-defined field; and identifying the record corresponding to the user-defined field among records in the custom field of the custom-field table based on the index value and the position; and an access mechanism which is configured to allow the database operation to access the identified record in the custom field of the custom-field table.

18. The apparatus of claim 17, wherein while mapping the user-defined field to the custom field in the custom-field table, the mapping mechanism is configured to:

calculating the position for the user-defined field based on the integer quotient, wherein the position facilitates identifying a specific row containing the user-defined field in the custom-field table; and calculating the custom field index for the user-defined field based on the index for the user-defined field and the number of custom fields in each row, wherein the custom field index identifies a specific custom field containing the user-defined field in the identified row.

19. The apparatus of claim 18, wherein while calculating the position, the database is configured to divide the index for the user-defined field by the number of custom fields in each row of the custom-field table to produce an integer quotient.

20. The apparatus of claim 18, wherein while calculating the custom field index, the database is configured to calculate the modulus of the index for the user-defined field with respect to the number of custom fields in each row.

21. The apparatus of claim 18, wherein if the database operation is an insert operation for user-defined field associated with a row in the existing table, the database is configured to insert a value for the user-defined field into the custom-field table by performing the following operations:

using the mapping to determine the position and the custom field index for the user-defined field; and inserting the values into a custom field associated with the custom field index in a row associated with the position and an index for a corresponding row in the existing table.

22. The apparatus of claim 18, wherein if the database operation is an update operation for the user-defined field associated with a row in the existing table, the database is configured to update a value for the user-defined field in the custom-field table by performing the following operations:

using the mapping to determine the position and the custom field index for the user-defined field; and updating the custom field that corresponds to the custom field index in a row that is associated with the position and an index for a corresponding row in the existing table.

23. The apparatus of claim 18, wherein if the database operation is a select operation for the user-defined field associated with a row in the existing table, the database is configured to select a value for the user-defined field from the custom-field table by performing the following operations:

using the mapping to determine the position and the custom field index for the user-defined field; and selecting the value stored in a custom field that corresponds to the custom field index in a row that is associated with the position and an index for a corresponding row in the existing table.

24. The apparatus of claim 17, wherein the database operation is a database operation defined by a Structured Query Language (SQL) query.

25. A computer-readable storage medium storing instructions which create a data structure, wherein the data structure comprises:

a custom-field table which is used to augment an existing table in a database, wherein a record of user-defined fields is mapped to a record in a custom field of a custom-field table associated with the table, wherein the record in the custom field is of the same data type and has the same value as the record in the user-defined field, and wherein a corresponding value for the record in the user-defined field is stored in the custom field at a position based on an integer quotient, which is determined by dividing the index value by the number of customer fields in each row of the custom-field table; and wherein a given row in the custom-field table includes:

a foreign-key field which is used to identify a corresponding row in the existing table;

metadata to provide a purpose associated with the custom field, wherein the purpose indicates a field name associated with a respective user;

multiple custom fields which are used to store user-defined fields associated with the existing table, wherein if the number of user-defined fields associated with each row in the existing table exceeds the number of custom fields in each row in the custom-field table, multiple rows in the custom-field table are used to store the user-defined fields associated with a single row in the existing table; and a position field which is used to is used to identify a specific row which stores a specific user-defined field in the custom-field table.

26. The computer-readable storage medium of claim 25, wherein a position and a custom field index can be used to map a given user-defined field to a given row and a given custom field in the custom-field table.

27. The computer-readable storage medium of claim 25, wherein the data type for a custom field in the custom-field table is defined in a table definition for the custom-field table.

28. The computer-readable storage medium of claim 25, wherein the data type for the custom fields in the custom-field table is a binary large object (blob) data type.

29. The computer-readable storage medium of claim 25, wherein a single custom-field table is used for all existing tables within a database.

30. The computer-readable storage medium of claim 25, wherein a custom-field table is used for each existing table within a database that is to be augmented.

31. The computer-readable storage medium of claim 25, wherein a separate custom-field table is used for each data type.

* * * * *

UNITED STATES PATENT AND TRADEMARK OFFICE
CERTIFICATE OF CORRECTION

PATENT NO.         : 7,801,886 B1
APPLICATION NO.    : 11/545400
DATED              : September 21, 2010
INVENTOR(S)        : Michael R. Gabriel et al.

It is certified that error appears in the above-identified patent and that said Letters Patent is hereby corrected as shown below:

In claim 9 (at column 15, line 33), please delete the word "records" so that the line reads: "wherein the record in the custom field of the".

In claim 10 (at column 15, line 57), please delete the word "value".

In claim 13 (at column 16, line 18), please delete the word "value".

Signed and Sealed this

Thirtieth Day of November, 2010

David J. Kappos
*Director of the United States Patent and Trademark Office*